June 27, 1961   M. R. FIELDS   2,990,078
TAMPER PROOF BOTTLE AND CLOSURE THEREFOR
Filed Nov. 18, 1957

INVENTOR
MACK R. FIELDS
by: Morris Spector
ATTY.

2,990,078
TAMPER PROOF BOTTLE AND CLOSURE THEREFOR
Mack R. Fields, 321 Ames Ave., Libertyville, Ill.
Filed Nov. 18, 1957, Ser. No. 697,025
13 Claims. (Cl. 215—42)

This invention relates to screw top bottle caps and to the tamper proof closing or sealing of bottles, and to bottles that are particularly adapted for receiving a cap of the present invention.

Bottle closures of the threaded type, usually applied to glass containers having a threaded neck portion, fall into three general classifications:

(1) Metal caps (steel or aluminum) preformed as a drawn shell upon the dependent skirt of which there is subsequently rolled or impressed a desired spiral threading.

(2) Plastic caps (thermosetting or thermoplastic) wherein the desired threading is molded as an integral part of the inner wall surface of the skirt portion.

(3) Metal caps in which the threads, instead of being formed on the cap prior to application to an associated container, are formed after the cap shell is placed over the open mouth of the bottle in the manner of a hood and while the closed top of the shell is held compressively against the bottle mouth, and a helical rotary action of steel rollers impresses a threaded adaptation of the skirt to the molded thread about the bottle neck adjacent the mouth.

Each of the foregoing types of bottle closures or caps has certain advantages and disadvantages.

It is well recognized that the threading about the neck of a molded glass container cannot be held to the close tolerances possible to threading cut into metal. In the usual commercial practice of producing molded glass containers, the split mold in which the bottle (and the threaded neck portion) have been formed, is opened while the glass is red hot, that is, before the glass has cooled sufficiently to become set or fixed into its final dimensions. Therefore, the inability to control, with any degree of preciseness, the finished dimensions of glass containers, has necessitated the establishment of certain standards of allowable tolerances. The GCMI (Glass Container Manufacturers Institute) sets the standards for the industry, and enforces compliance, so that a specified thread of a closure and bottle will fit properly, regardless of the supplier or manufacturer.

Because of the relatively wide tolerances permitted in the glass thread dimension, the application of a closure by rapid mechanical means favors the use of a metal cap because of the ability of the threading in a metal cap to yield at points of frictional contact with the container threads and conformably adapt to the non-uniform contour of the glass threads. This permits application of maximum torque to draw the cap down sufficiently far so as to insure compressive imbedment of the bottle mouth into the resilient face of the cap liner disc and provide an effective seal. The closure (screw cap) for a glass bottle having a threaded neck portion adjacent the mouth or filling opening, may be said to provided an effective seal when the helical travel of the cap has caused the bottle mouth to become sufficiently embedded into the face of the resilient lamina of the cap liner to seal off the irregularities of the top surface of the bottle mouth.

Contrasted to the metal cap, the internal molded thread of a plastic closure is much less adapted to conformably yield itself to the non-uniform glass thread formation because of the lesser resiliency of the plastic cap wall. Since plastic caps are applied to the glass container by the same mechanical means as are metal caps, the torque for application of the plastic caps must be adjusted to a lower value indicated for plastics or the caps will sometimes split. This can be traced to the bottle thread being at the extremes of the allowable tolerance. A metal cap will provide a tight closure without the breakage attendant the use of plastic caps.

Offsetting the advatnages in the speed and certainty of application of the metal cap, is the disadvantage of appearance, as compared to plastic caps, due to exposed thread contour and finger grip knurl.

Therefore, the present invention seeks to employ a single shell metal cap for its ease, speed and certainty in application and at the same time take advantage of the aesthetic attractiveness of the plastic cap.

As a further consideration, it is well recognized that when a closure of the screw cap type is applied to an associated bottle or container, the cap will rarely end up with any given points on the cap and on the bottle neck in alignment. The variations in the glass thread, the initial position of the cap relative to the bottle neck, and the resiliency of the cap liner and its sealing engagement against the uneven bottle mouth end, all are factors of variance which preclude even with uniformly applied torque, the consistent matching of a given point on the cap with a given point on the bottle neck.

Therefore, to provide a screw cap which will give a tamper-proof seal by the incorporation of a dependent, frangible tongue or tab to fit into a complementally formed recess or seat in the bottle, it will be readily seen that special means must be provided to assure that the tab would align with the bottle tab receiving recess or seat.

It is therefore a principal object of this invention to provide a bottle closure of the type discussed and possessed of the attributes incorporating the working advantages of the metal cap with the attractiveness of the plastic cap and, a the same time, if so desired, supply a tamper-proof device as a part of the cap. It is proposed, to achieve this object, to use the conventional metal screw cap and a plastic cup in the form of a hood wherein the skirt portion is placed over the cap to make a tight friction fit therewith after the cap has been applied to the bottle.

Since the plastic cup will be placed over the cap after the cap is screwed onto the bottle, it is feasible to have any desirable indicia on the plastic cup or shell in such position that it will be in alignment with corresponding indicia or label on the bottle body to enhance the overall appearance of the bottle and its contents. It will be appreciated that such alignment is not feasible with the conventional type of metal or plastic caps.

It is a further object of this invention to provide a bottle closure means which will be suitable for use with current mechanical means or machines for sealing the mouths of bottles and entail a minimum of modification or operation of the current machines.

The above and other objects may be attained by practicing this invention which embodies among its features the combination of a single walled metal bottle cap having threading impressed about its skirt portion, and an integrally formed plastic shell, in the form of a cup, fitted over the cap in tight frictional locking engagement with the cap.

Another feature of this invention embodies, in addition to the structure above, a frangible tab on the plastic shell skirt extending axially therefrom at the open end thereof to cooperate with a bottle or container having a groove or recess formed in the neck thereof, complementally formed to provide a pocket for the frangible tab, one end of the groove or recess being gradually sloped or tapered to define a cam surface upon which the tab can ride out of its seat as the closure is twisted in its opening direction and be flexed by the cam into a position at right angles to its normal position. There is provided a line of weakness across the end of the tab at its juncture with the shell skirt to afford a hinge-like movement of the tab as the bottle cap is unscrewed. This line of weakness extends from one side of the tab to the other and is so graduated that upon a rebending to assume its original position, the tab will break away from the plastic shell. To facilitate this breaking action the plastic of the shell is one that is frangible when subject to such action. Polystyrene is one suitable plastic.

Other objects, advantages and features will become apparent from the following detailed description, forming the specification, and taken in conjunction with the drawings, forming a part thereof and in which.

Reference may now be had more particularly to the drawing wherein like reference numerals designate like parts throughout.

Figure 1:
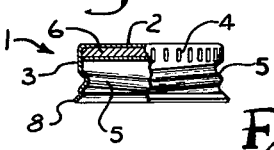
FIG. 1 is a side view, partially broken away, of a screw type cap forming part of the closure of the present invention.

In the drawing there is shown at 1 a single shell one-piece drawn metal cap having top circular portion 2 and a depending skirt 3, the top of the skirt may be knurled as indicated at 4. The skirt has a screw thread 5 impressed therein for threading over the threads on the outside of the neck of a bottle in a conventional manner. A conventional circular compressible or yielding cap liner 6, for sealing purposes, is positioned within the cap. This much of the cap is conventional in the art. Such caps conventionally have an outwardly extending peripheral flange that is located at the bottom of the depending skirt and which is thereafter curled outwardly and upwardly to form a bead to conceal the sharp edge. This beading operation is, in the present instance, omitted. Also, in the drawing of the metal during fabrication of the cap the rim in the resulting product is not a true circle. In the practice of this invention this deviation does not have to be corrected. Instead, this fact is utilized, as will be hereafter explained. The peripheral flange or rim may or may not be trimmed, and, whether it is trim cut or not, it is formed to extend downwardly at an angle to approximately 45° to the longitudinal axis of the cap as indicated at 8 in FIG. 1. The entire cap is preferably made of sheet metal, such as steel. The flange 8 extends downwardly and outwardly at an angle of 45° and terminates in a rough sharp edge which is of a generally circular shape but deviates from a true circle, due for instance, to normal manufacturing variations, which may, if desired, be here deliberately accentuated, although that is not indispensable.

Figure 2:
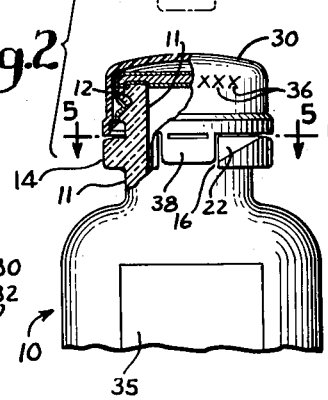
FIG. 2 is a side view, in partial section, of a bottle closed by the closure of the present invention.
Figure 5:
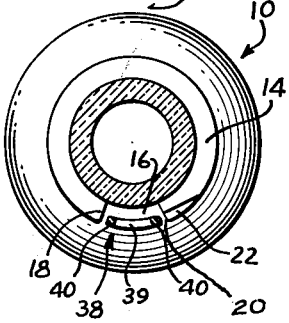
FIG. 5 is a sectional view taken along the line 5—5 of FIG. 2.
Figure 3:
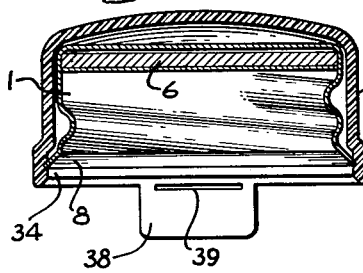
FIG. 3 is a double size longitudinal view of the closure of the present invention.

The cap 1 is shown in FIG. 2 as applied to a bottle 10 which also forms a part of the present invention. The bottle is, except for the tamper-proof feature, to be hereafter explained, of a conventional construction and it includes a neck 11 that provides for filling the bottle or for pouring out the contents of the bottle. The neck has around the outside thereof a conventional helical thread 12 for receiving a conventional screw type closure cap. Below the top of the neck there is a flange or bead 14. this instance the flange or bead 14 has a notch 16 formed therein, one vertical edge 18 of which extends substantially radially as seen in FIG. 5, whereas the opposite vertical edge 20 has a cam surface 22 joining it with the periphery of the flange or bead 14. In other respects this bottle is conventional.

The cap of FIG. 1 is screw-threaded over the neck of the bottle by standard proceedings and tightened thereon so that the cap liner 6 is compressed and forms a liquid tight seal over the top of the neck of the bottle, all as conventional. After the bottle has thus been tightly capped, the cap is covered by a plastic cup shaped shell or hood 30.

The plastic shell is of a height in excess of the height of the cap, and has a peripheral circular rim 32 at the bottom thereof. The inside surface 34 of the rim is approximately a true circle but deviates from a theoretically true circle by the amounts ordinarily found in industrial processes, so that the inside diameter of the surface 34 is different at different places of measurement thereof. This difference may be of a magnitude of the order of 0.001 inch or a few multiples thereof. The inside diameter 34 is smaller than the outside diameter of the flange 8 by approximately 0.010 inch to 0.020 inch. The plastic shell 30 has a tab 38 formed integrally with and projecting axially of the bottom of the rim or flange 32. This tab is weakened by a slit or score line 39 to facilitate breaking of the tab from the shell.

The shell 30 is first positioned over the capped bottle with the tab 38 in vertical alignment with the notch or slot 16. It is then telescoped over the cap 1 by a vertical sliding movement until the bottom of the rim 32 engages the bead 14. When the surface 34 engages the periphery of the flange 8, continued downward movement of the shell flexes the flange radially inwardly, and that flange, due to its flexibility exerts an outward push on the surface 34. The sharp edge of the flange bites into the plastic surface 34 and by a "fish hook" action it permits movement of the shell upon the cap, but prevents retraction of the shell from the cap. In other words, the shell can be pushed down over the cap but cannot be pulled up. The shell is also locked with the cap against relative rotation of the two. The "out of roundness" of the flange 8 and of the surface 34, taken alone or in combination with the inward deflection of the metal edge of the flange 8, or the tight fit with the flange 8 causes an interlocking such that the shell cannot be turned with respect to the cap, but transmits turning torque to the cap.

The downward positioning movement of the shell over the cap brings the tab 38 into the notch 16. When a torque is applied to the shell to turn the cap in a direction such as to unthread the cap from the neck of the bottle, the edge of the break tab 38 rides over the cam surface 22 and is pushed radially outwardly by that cam surface, to a position approaching right angles to its normal position. If an attempt is made to flex the tab back to its normal position, it will fracture at the two narrow frangible bridges 40—40. The breaking of the tab, or the flexing thereof beyond its elastic limits, leaving permanent creases across the bridges 40—40, indicates tampering, or, stated conversely, if the tab is in its normal position in the notch 16, that is an indication that the bottle has not been tampered with.

Figure 4:
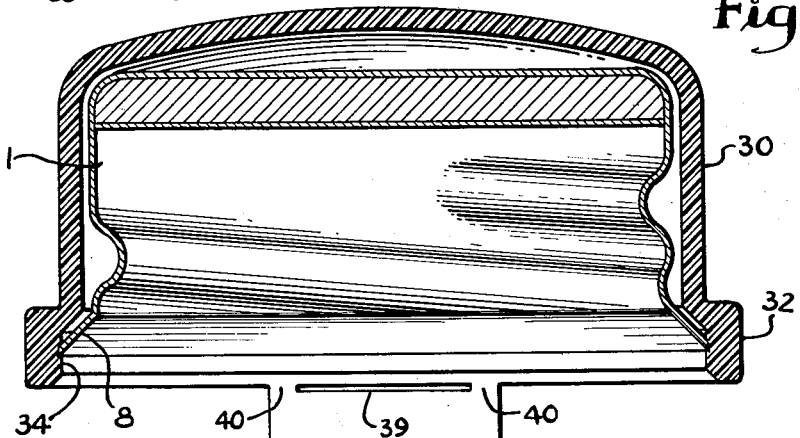
FIG. 4 is a further enlarged sectional view of the closure of FIG. 3.

In FIG. 4 there is shown, to a very much enlarged scale, what is believed to be the interlocking action between the sharp edge of the flange 8 and the inner surface of the plastic shell. When the plastic shell is pushed over the metal cap that has been threaded on to a bottle, the downward pressure forces the flange 8 to yield inwardly to adapt itself to the smaller internal diameter 34 of the shell, due to the fact that the thickened rim 32 of the shell is comparatively more rigid than the flange 8. There is thus created an outward spring tension of the metal of the rim 8. This tension of the sharp metal edge causes a "bite" or "fish hook" embedment of the edge of the flange 8 into the softer plastic surface 34 which prevents the plastic shell from being retracted from the metal cap once the two are assembled. The two are also interlocked against relative rotation due to the biting action and also the fact that neither internal surface of the bore 34 nor the edge or rim of the flange 8 is a theoretically true circle. The deviations are very small but do exist, and the deviations in the rim are not coincident with the deviations in the shell. The two surfaces are thus brought into interlocking relationship and kept in interlocking relationship by the resiliency of the material.

Figure 8:
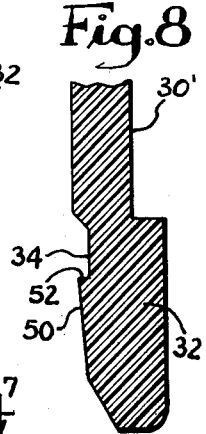
FIG. 8 is a sectional view taken along the line 8—8 of FIG. 6.
Figure 7:
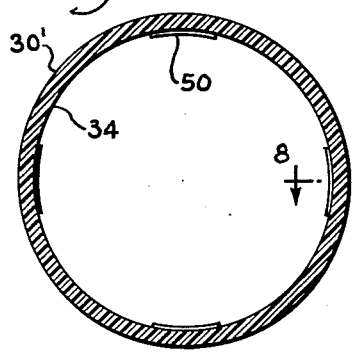
FIG. 7 is a sectional view taken along the line 7—7 of FIG. 6.
Figure 6:
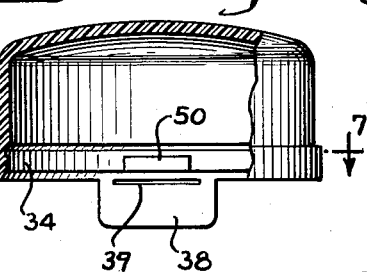
FIG. 6 is an enlarged sectional view of a shell of a modified construction, for use in forming a closure of the present invention.

In FIGS. 6, 7 and 8 there is shown a modification of the inner surface of the rim 32 of the shell 30' that corresponds in other respects to the shell 30. This modification consists essentially in the provision of four (or more) fins or lands 50 formed on the inner surface 34 of the flange 32. Each land extends approximately 25 degrees in a circumferential direction and projects radially inwardly from the surface 34 approximately 0.005 inch. They therefore provide shoulders 52 upon which the edge of the flange 8 seats for further inhibiting retraction of the shell from the cap once it has been slid into position thereon. The lands 50, may, if desired, constitute one land extending through any arcuate extent up to 360°. The inside diameter 34 is, as before, about 0.010 inch to 0.020 inch smaller than the outside diameter of the flange 8.

The bottle 10 may have a conventional label or other printed matter 35 thereon, and the shell may have corresponding printed matter 36 thereon.

The bottle closure of the present invention comprises the cap 1 with its interlocked shell 30. When the closure is removed from the bottle and the tab 38 fractured or permanently distorted, that fracture or distortion indicates that the bottle has been opened, but does not prevent the customer from continuing to use the closure comprising the shell or hood 30, with its single shell metal cap locked therein. The user of the bottle may reopen or reclose the same by unthreading the closure from the bottle or re-threading the closure on to the bottle, the same as with a conventional screw thread cap.

The plastic shell 30 may be made of any desired height provided only that it is of a height at least a small amount greater than the height of the cap 1, that small amount being the amount necessary for interlocking the two. An appreciably greater height of the closure is sometimes desired for esthetic reasons.

In compliance with the requirements of the patent statuts, I have herein shown and described a preferred embodiment of the present invention. What are considered new and sought to be secured by Letters Patent are:

1. A bottle closure comprising a single walled metal cap having a depending shank portion with threading impressed therein, and a shell having a skirt extending from one end thereof to the other end and said other end being an open end of the shell, the minimum internal diameter of the shell at said open end thereof being less than the external diameter of the cap at said open end thereof, the differences being sufficiently small to permit telescoping of the shell over the cap within the elastic limits of the shell, the shell being of a softer material than the cap to facilitate a biting action of the cap into the shell wall, the cap having means for biting into the material of the shell, said shell being press fitted over said cap into frictional locking engagement therewith and having its skirt extending beyond the free end of said cap shank portion and compressing said metal cap along its open end to provide an outward resilient pressure as the shell is forced down over the cap, and causing the resiliently biased open end of the cap to engage the adjacent face of said shell under the influence of such bias to provide a positive locking engagement between the cap and the shell.

2. A bottle closure comprising a bottle cap having threads impressed in the side wall thereof for threading over the neck of a bottle, said cap having an outwardly projecting peripheral flange around the open end of the cap, and a sleeve over the closed end of the cap and extending from there to and beyond the flange to cover the exposed threads, the sleeve being of a material softer than the material of the cap, the flange being at an angle other than a right angle to the inner surface of the sleeve and engaging the sleeve and having scratching projection means biting into the softer material of the sleeve and locking therewith so that the flange prevents axial movement of the sleeve with respect to the cap in one direction but not in the opposite direction, said sleeve being locked against rotation with respect to the cap so that a turning torque applied to the sleeve is transmitted to the cap.

3. In combination, a single walled bottle cap having a substantially circular shaped skirt portion with threads impressed therein for threading around the neck of a bottle, said skirt having a projection around the outer periphery thereof at the open end thereof which projection extends at an angle to the longitudinal axis of the cap and terminates in a sharp edge, and a sleeve member around the skirt of the cap and of material softer than the material of the cap and locked thereto against relative rotation and engaged by the sharp edge of the projection penetrating the surface of the shell to prevent retraction thereof from the skirt, said sleeve projecting axially beyond the open end of the cap.

4. In combination with a bottle having a threaded neck portion providing a pour-out opening, said neck having a recess in its outer surface immediately below the threaded portion and spaced from the longitudinal axis of the neck, a closure for the opening, said closure comprising a single walled metal cap having a depending shank portion with threading impressed therein, and a shell closed at one end and having a depending skirt slightly tapering outwardly from said closed end towards its open end, said shell being press fitted over said cap into frictional locking engagement therewith and having its skirt extending beyond the free end of said cap shank portion and compressing said metal cap along its open end to provide an outward resilient pressure as the shell is forced down over the cap, and causing the resiliently biased open end of the cap to engage the adjacent face of said shell under the influence of such bias to provide a positive locking engagement between the cap and the shell, and a tab on the shell extending into said recess and confined by the walls defining the recess.

5. A bottle having a neck with a pour out opening therethrough, threads formed on the neck for engagement with a screw type cap closure, the part of the bottle that is immediately below the neck having a recess formed therein with at least one of the walls of the recess extending axially of the neck and projecting radially of the neck a distance from the center of the neck greater than the maximum radius of the neck, said one wall tapering in radial thickness from a maximum at the bottom of the recess to a minimum at the top thereof.

6. A bottle having a neck with a pour out opening therethrough, threads formed on the neck for engagement with a screw type cap closure, the part of the bottle that is immediately below the neck having a recess formed therein with at least one of the walls of the recess extending axially of the neck and projecting radially of the neck a distance from the center of the neck greater than the maximum radius of the neck, said one wall of the recess having a camming surface formed therein and in a position to receive and act upon any projection that may extend axially from the cap closure, said camming surface extending from the bottom of the recess in a direction upwardly and tapering from a minimum circumferential width at the bottom of the recess to a maximum circumferential width at the top thereof.

7. A closure for a container having a threaded access neck comprising: a single walled metal cap having a depending shank portion with threads impressed thereon for threading onto the container neck, said shank portion having an outwardly directed compressible peripheral flange at its open end, and a shell of material softer than the cap and making a press fit over said flange of the cap and compressing the same radially inwardly and with the flange frictionally engaging the internal face of said shell and thereby providing a positive locking engagement between the cap and the shell, said shell having a tamper indicating tab projecting from the end thereof that is fitted over the flange.

8. A bottle closure comprising a metal cap having an open end and a circular skirt portion which is screw threaded and adapted to be positioned in screw threaded relationship to the screw threads on the neck of a bottle or the like, said skirt portion terminating at said open end of the cap in a rim of larger external diameter than the screw threads, said cap having a shell locking portion integral therewith, and distributed through an angular extent approximating 360° and being centered on the same longitudinal axis as is the skirt portion, said shell locking portion being at an end of the cap and spaced both axially and radially from the screw threaded part thereof, and a plastic shell telescoped over the cap and having a shell skirt surrounding the skirt portion of the cap, said shell also having a peripheral rim of an internal diameter greater than the internal diameter of the shell skirt and receiving said rim of the cap, said cap being frictionally engaged by and locking with the shell locking portion of the cap.

9. A container comprising a hollow container body providing a neck portion having a terminal end and a passage extending from the hollow body interior and open at said terminal end, said neck portion having external threading for engagement by a screw type closure, and providing an integral external projection which has a recess therein open in the direction of said terminal end and said recess being defined by side walls, and the projection having a recessed surface portion intersecting one of said recess side walls and extending to mergence with an outer surface of the projection.

10. A container comprising a hollow container body providing a neck portion having a terminal end and a passage extending from the hollow body interior and open at said terminal end, said neck portion having external threading for engagement by a screw type closure, said container having an integral external projection adjacent to but spaced from said terminal end and threading, said projection having a recess therein open in the direction of said terminal end, said recess having at least one side wall, and the projection having a cam surface intersecting said recess side wall, said cam surface sloping from the top surface of the projection radially outwardly and in a direction axially away from said neck terminal end, to mergence with said outer surface of the projection.

11. In combination, a container having an externally threaded closure-receiving access neck open at its terminal end, said neck having an integral external projection spaced from said threading, the projection having a recess therein open in the direction of said terminal end and having said recess at least one side wall, said projection further having a cam surface intersecting said recess side wall and extending from the top of the projection in a direction axially away from the terminal end of the neck and radially outwardly, a threaded cap in threaded securement on said threaded neck, and a shell having a projecting frangible tab, said shell being sleeved over said cap with said tab received in said recess, and said shell being secured to the cap gainst retraction therefrom, and said tab engaging said cam surface upon turning of said shell with the cap in the unthreading direction, and being thereby mutilated to indicate that the shell has been turned.

12. In combination with a bottle having a threaded neck constituting a filling and pour-out opening, said neck having a recess in its outer surface immediately below the threaded portion of the neck, a closure for the filling opening, said closure comprising a cap having a threaded skirt surrounding the neck and with the threads of the closure in engagement with the threads of the neck, and a plastic shell having a depending skirt surrounding and extending beyond the cap skirt, means locking the shell to the cap against axial movement with respect thereto, a frangible tab carried by the skirt of the shell and projecting downwardly therefrom, means forming a zone of weakness at the juncture of the tab with the shell skirt, said tab being received into said recess when the shell is placed over the cap on said bottle, said bottle having on one side of the recess an outward extension defining a camming surface upon which the tab can ride and be cammed out of said recess as an unscrewing twisting torque is applied to said closure forcing the tab to move to a position at an angle to the skirt, thereby causing a fracture at said zone of weakness.

13. A bottle closure comprising a cap having a skirt with threads therein, a peripheral flange on said skirt, and a shell telescoped over the cap skirt and flange thereon, said shell being of a material softer than the material of the cap, the flange being at an angle to an inner surface of the shell and being sized such that the diameter of the cap at said flange is greater than the internal diameter of said inner surface of the shell, the differences in diameter being sufficiently small to permit expansion of the shell within its elastic limits when the shell is telescoped over the cap, said flange having means for biting into the material of the shell at said inner surface to lock the shell against axial retraction from the cap.

References Cited in the file of this patent

UNITED STATES PATENTS

| | | |
|---|---|---|
| 973,397 | Wilzin | Oct. 18, 1910 |
| 1,968,748 | Conlin | July 31, 1934 |
| 2,204,831 | Snodgrass | June 18, 1940 |
| 2,462,010 | Spender | Feb. 15, 1949 |